United States Patent [19]

Devarakonda et al.

[11] Patent Number: 5,566,297
[45] Date of Patent: Oct. 15, 1996

[54] NON-DISRUPTIVE RECOVERY FROM FILE SERVER FAILURE IN A HIGHLY AVAILABLE FILE SYSTEM FOR CLUSTERED COMPUTING ENVIRONMENTS

[75] Inventors: Murthy V. Devarakonda, Ossining; William A. Kish, Millerton; Ajay Mohindra, Tarrytown, all of N.Y.

[73] Assignee: International Business Machines Corporation, Armonk, N.Y.

[21] Appl. No.: 260,868

[22] Filed: Jun. 16, 1994

[51] Int. Cl.⁶ .................................................. G01R 31/28
[52] U.S. Cl. ........................... 395/182.13; 395/182.11; 364/269.2; 364/944
[58] Field of Search ........................... 395/575, 182.11, 395/182.08, 181, 182.13; 371/9.1, 7, 8.1; 364/268, 268.3, 268.8, 268.9, 269.2, 269.3, 943.91, 944, 944.2, 944.3

[56] References Cited

U.S. PATENT DOCUMENTS

| | | | |
|---|---|---|---|
| 4,709,325 | 11/1987 | Yajima | 364/200 |
| 4,775,976 | 10/1988 | Yokoyama | 371/9.1 |
| 4,817,091 | 3/1989 | Katzman et al. | 371/9.1 |
| 4,872,106 | 10/1989 | Slater | 364/200 |
| 4,941,087 | 7/1990 | Kap | 364/200 |
| 5,008,805 | 4/1991 | Fiebig et al. | 371/9.1 |
| 5,117,352 | 5/1992 | Falek | 395/525 |
| 5,121,486 | 6/1992 | Kurihara et al. | 364/268 |
| 5,134,712 | 7/1992 | Yamamoto | 395/575 |
| 5,157,663 | 10/1992 | Major et al. | 371/9.1 |
| 5,202,980 | 4/1993 | Morita et al. | 395/575 |
| 5,235,700 | 8/1993 | Alaiwan et al. | 395/575 |
| 5,247,692 | 9/1993 | Fujimura | 395/575 |
| 5,276,823 | 1/1994 | Cutts, Jr. et al. | 395/575 |
| 5,303,243 | 4/1994 | Anezaki | 371/9.1 |
| 5,307,481 | 4/1994 | Shimazaki et al. | 395/575 |
| 5,313,664 | 5/1994 | Sugiyama et al. | 395/575 |

Primary Examiner—Robert W. Beausoliel, Jr.
Assistant Examiner—Trinh L. Tu
Attorney, Agent, or Firm—Richard M. Ludwin

[57] ABSTRACT

A system and method for non-disruptive recovery from a file server failure. State information for a file system managed by a server is maintained among a plurality of client nodes of a distributed system. When a failure of the server is detected, all ongoing requests to server are suspended. Then, the state information in each client node is transferred to an identified back-up server. Based on the state information, the file server state prior to the failure is reconstructed. After the reconstructing the file system, the suspended requests are restarted on the back-up server.

13 Claims, 5 Drawing Sheets

NON-DISRUPTIVE RECOVERY FROM FILE SERVER FAILURE IN A HIGHLY AVAILABLE FILE SYSTEM FOR CLUSTERED COMPUTING ENVIRONMENTS

I. BACKGROUND OF THE INVENTION a. Field of the Invention

This invention relates to non-disruptive recovery from file server failures in clustered (distributed) computing environments.

b. Related Art

In a loosely coupled system, multiple data processing nodes, each under control of its own operating system, are joined by a communications network and have shared files stored on disks. Access to the shared files is coordinated by a set of protocols which are implemented in each of the respective system's control program (operating system). The entity that provides access to the file is known as a file-server, or a data-server.

One concern in loosely coupled systems is that if the file-server fails then the shared data serviced by that file-server becomes unavailable. There are several techniques that have been proposed for handling recovery of file-server failures. Some of the schemes include maintaining replicated copies of the file system state. Other schemes involve restarting of the failed server subsequent to a crash. In the former case, each operation on the file system is done on all copies of the file system, resulting in significant loss of performance for file system operations. In the latter case, any attempted operations on the filesystem while the file server is unavailable will fail until the file server is restarted.

II. SUMMARY OF THE INVENTION

The present invention provides a method for non-disruptive recovery from a file server failure. In accordance with the method, the state information for a file system managed by a server is maintained among a plurality of client nodes of a distributed system. When a failure of the server is detected, all ongoing requests to server are suspended. Then, the state information in each client node is transferred to an identified back-up server. Based on the state information, the file server state prior to the failure is reconstructed. After reconstructing the file system, the suspended requests are restarted on the back-up server.

III. BRIEF DESCRIPTION OF THE DRAWING

The present invention will be understood by reference to the drawing, wherein.

IV. DETAILED DESCRIPTION OF THE PREFERRED EMBODIMENT

Figure 1:
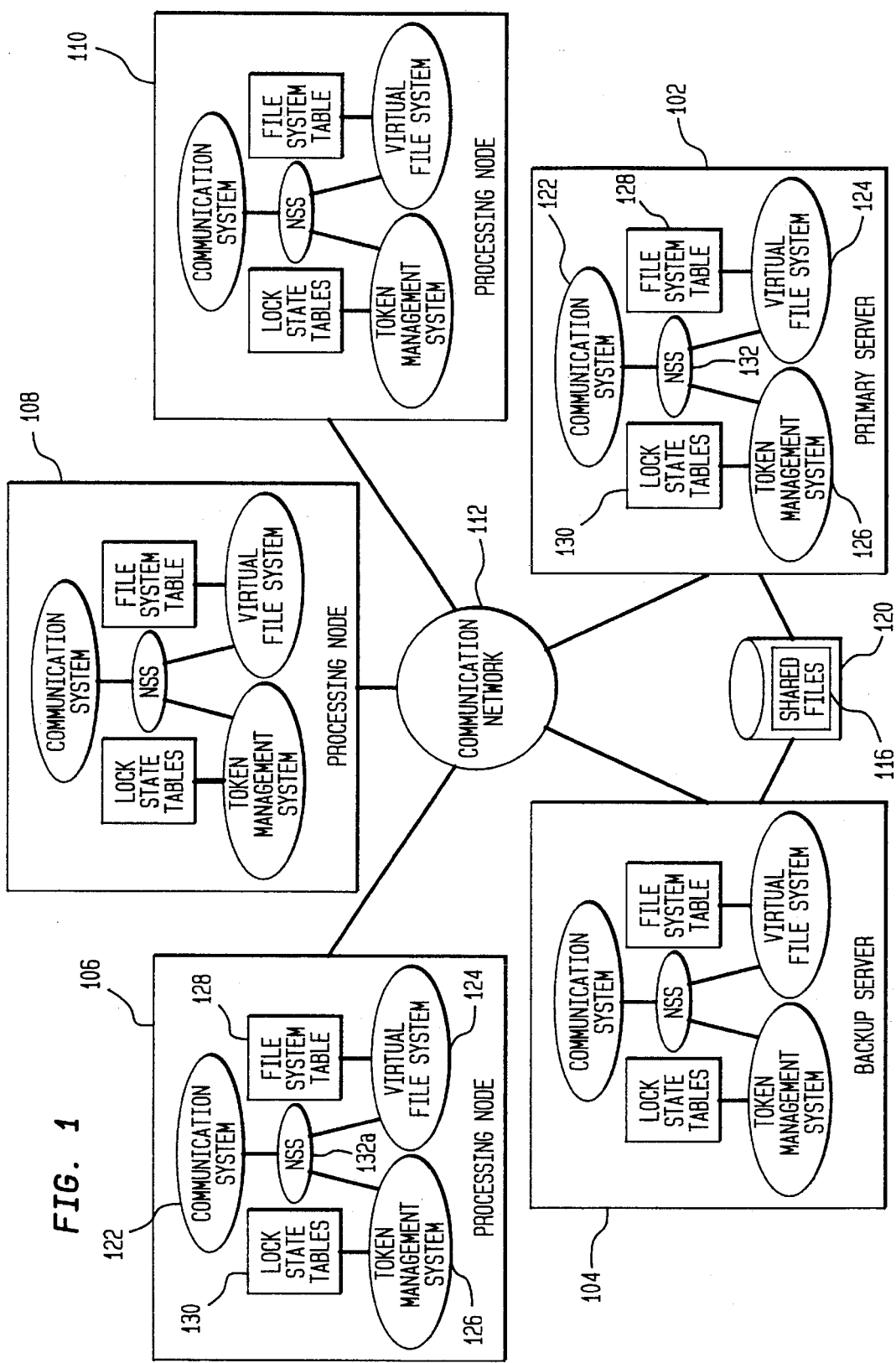
FIG. 1 depicts a loosely coupled system suitable for use with the present invention.

FIG. 1 depicts a loosely coupled system suitable for use with the present invention. The system architecture can be, for example, of the type described in U.S. patent application Ser. No. 08/187,432 filed on Jan. 26, 1994, which is incorporated by reference herein in its entirety. The system includes a number of processing nodes (sometimes referred to as nodes) 102–110 interconnected by way of a communication network 112. The nodes 102–108 can be embodied, for example, on IBM RISC System/6000 machines using AIX 3.2. The communications protocol can be, for example, SUN Microsystems RPC (remote procedure call), which can run either on UDP/IP or TCP/IP. The network 112 can be of any conventional type, for example a token ring.

One of the processing nodes 102 is designated as a primary file server and another one of the processing nodes 104 is designated as a back-up server. Shared files 116, accessible to all of the processing nodes on the network, 116 reside on a dual ported disk 120 connected to the primary server 102 (by way of a first port) and the back-up server 104 (by way of a second port). All requests for shared data are serviced by the primary server 102. However, if the primary server 102 fails, the back-up server 104 takes over the servicing of requests for the shared data.

It should be understood that in alternative embodiments, each of the processing nodes can be a primary file server with respect to the file systems that it owns while being a client with respect to file systems owned by another processing node. Similarly, any processing node can be a back-up server for any primary server with which it shares a disk by way of a direct access port.

Each processing node 102–110 includes three subsystems: communication 122, virtual file system (VFS) 124, and token (lock) management (TM) 126. In order to provide for non-disruptive recovery, each of these subsystems maintains their state in a file system table 128 and a lock state table 130 (on its processing node) in such a way that there is never a point at which the only copy of a given state representation is located in the server's volatile storage.

Each processing node 102–110 has a Node Status Server (NSS) 132 that keeps track of the well being of other processing nodes. All Node Status Servers in the system are dormant except for a designated "leader" NSS 132a. When the leader NSS 132a detects a failure, it initiates a recovery protocol which will be described in more detail later. If the processing node with the leader NSS fails then another node's NSS becomes the leader in accordance with a pre-assigned priority order. Each processing node maintains the file system status for all mounted file systems in a File System Table 128.

When the leader NSS detects a failure of the file server, it determines the identity of the back-up server and informs the back-up server about the failure prior to informing other client nodes. The back-up server can be a different node physically connected to the same disk as the primary server, or it can be the primary server, which has restarted normal functioning after the failure. A back-up server can be designated statically, or at runtime.

Provided that the above constraints are satisfied, the recovery from file server failures occurs in four phases as follows:

In phase I, when the leader NSS detects that a file server node has crashed, it sends a NODE_DOWN message first to the back-up server and then to all other client nodes. Upon receipt of the NODE_DOWN message, each node marks the status of the filesystem served by the failed server as UNAVAILABLE. After the status of the filesystem has been marked as UNAVAILABLE, no new requests on the filesystem can be issued/entertained.

After the completion of phase 1, in phase 2 the leader NSS sends a CLEANUP_STATE message to the back-up server.

The back-up server after receiving the CLEANUP_STATE message runs consistency checks on the filesystem disk and cleans up any leftover state for the failed filesystem.

After the completion of phase 2, in phase 3 the leader NSS sends a START_RECOVERY message to the back-up server and all the client nodes. After receiving the START_RECOVERY message, each node changes the filesystem status from UNAVAILABLE to RECOVERING. After changing the filesystem state, each client node sends RECOVERY messages to the back-up server. Each RECOVERY message contains the state of the filesystem as perceived by the client. The back-up server receives RECOVERY messages from all the client nodes and reconstructs the state of the filesystem.

After the completion of phase 3, in phase 4 the leader NSS sends a RECOVERY_COMPLETE message to the back-up server and all the client nodes. Upon receipt of the RECOVERY_COMPLETE message, each node changes the filesystem status from RECOVERING to AVAILABLE. All suspended operations on the file system are resumed.

Figure 2:
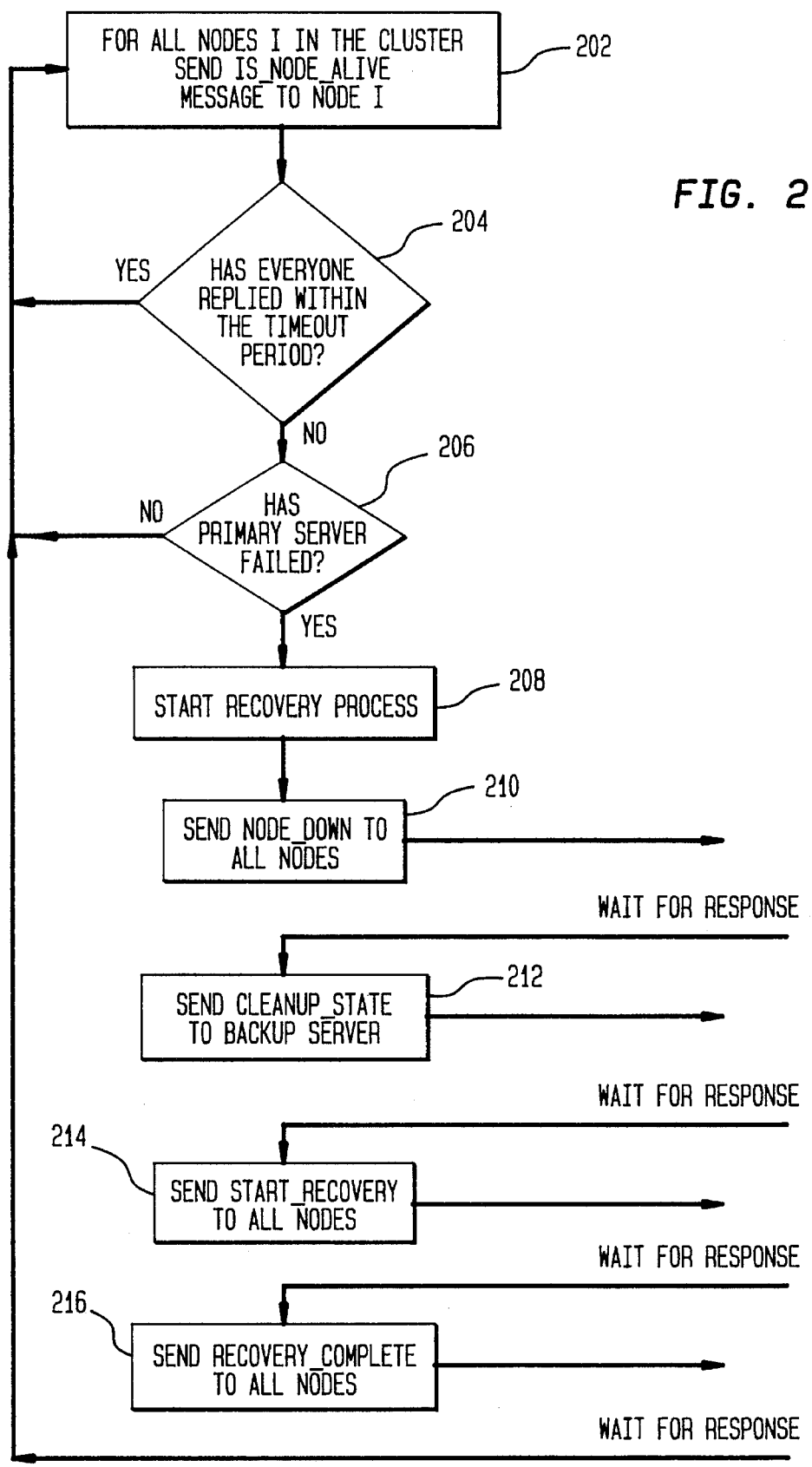
FIG. 2 shows the flow chart for determining the start of the recovery operation.

FIG. 2 is a flow chart of a method for determining the start of the recovery operation. In step 202, the leader NSS periodically (e.g. every 5 seconds) sends an IS_NODE_ALIVE 304 message to each of the nodes in the system. In response to the IS_NODE_ALIVE message, each node sends an acknowledgment.

In step 204, the leader NSS determines if all of the nodes have replied within a timeout period (e.g. 30 seconds). If acknowledgments have been received from all the nodes within the timeout period, then the leader NSS resumes periodic sending of IS_NODE_ALIVE messages.

If, in step 204, the leader NSS determines that any node in the system has failed to respond within the specified timeout period, in step 208 leader NSS determines if the failed node was the primary-server of data. If the failed node is not the primary-server then the leader NSS resumes periodic sending of IS_NODE_ALIVE messages 202. If, in step 206, the leader NSS determines that the failed node is the primary-server then it starts the recovery process in step 208.

As the first phase of the recovery process, in step 210 the leader NSS sends a NODE_DOWN message 306 to all the nodes in the system and waits for a response from all of the nodes. After receiving responses from all the nodes, in step 212, NSS sends a CLEANUP_STATE message 308 to the back-up-server. In response to the CLEANUP_STATE message, the back-up-server 104 performs consistency checks on the shared-data and prepares for receiving RECOVERY message 312 from other nodes. If a response is not received from a node then NSS declares that node to have failed, and continues with the recovery operation.

In step 214, the leader NSS sends a START_RECOVERY message 310 to all the nodes. In response, each of the nodes starts a recovery process during which is traverses its local data structures and sends the file system state to the back-up server. The file system state includes, for each referenced file, information describing: open modes and counts, mapped reference counts, descriptors for byte range locks, and the token (lock) state. The processing node traverses its lock state tables 130 and transfers (to the back-up server) the lock state information of the tokens cached at the node. In addition, modified (dirty) data pages of any files belonging to that file system are flushed (written) back to the back-up server. After all nodes have completed recovery and have sent an acknowledgment, in step 216 the leader NSS sends a RECOVERY_COMPLETE message 314 to all the nodes. Subsequent to completing recovery, the leader NSS resumes periodic sending of IS_NODE_ALIVE messages in step 202.

Figure 3:
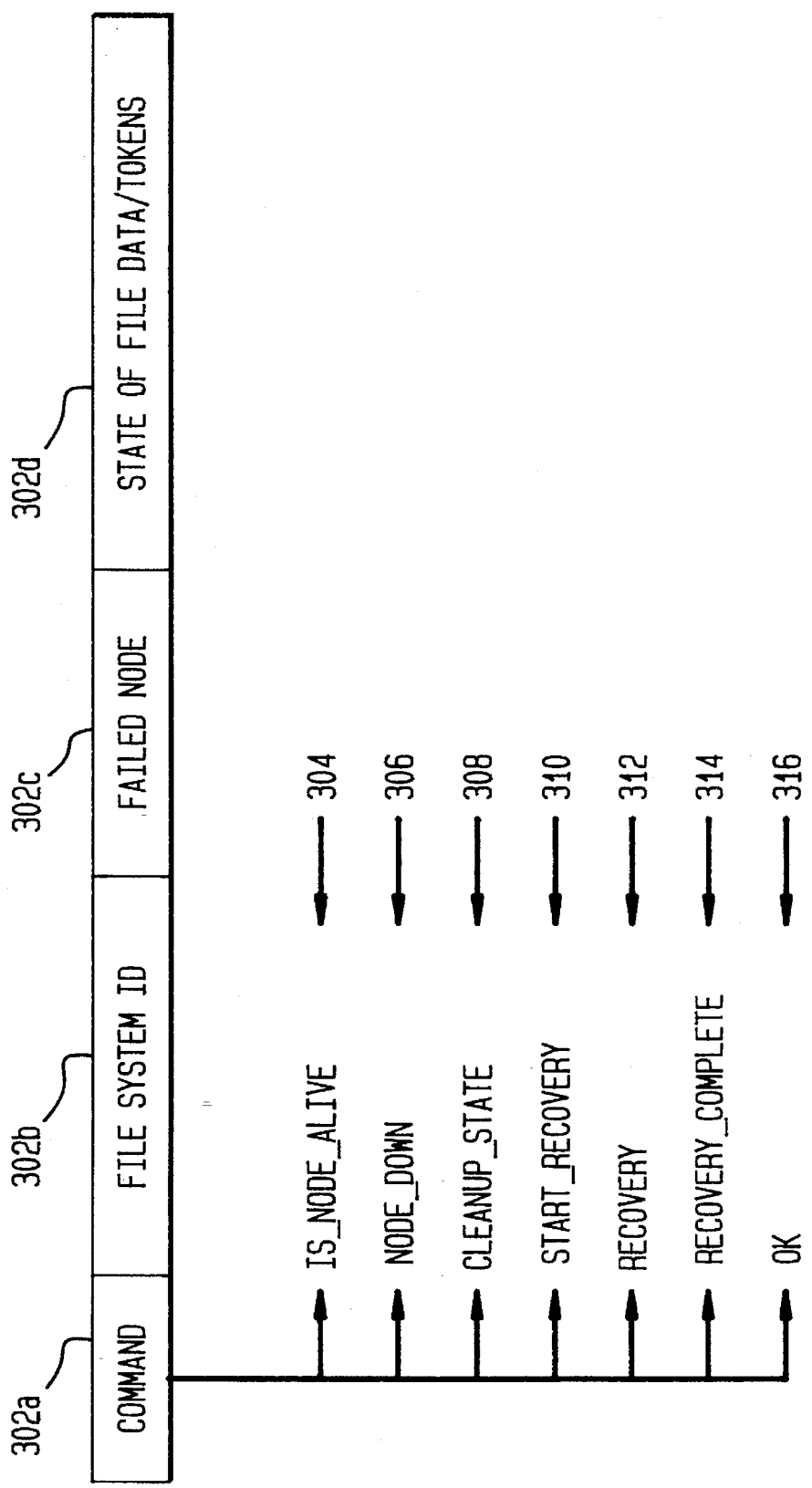
FIG. 3 shows the message formats in the present system.

FIG. 3 shows the message formats in the present system. The message structure consists of the following fields: a Command 302a, which indicates the operation to perform at a node; a Filesystem Id 302b, which identifies the filesystem referred to in the message; Failed node 302c, if valid, indicates the node that failed; State of file data/tokens 302d, if valid, contains the state of the file data and tokens corresponding to the filesystem indicated in 302b.

The "IS_NODE_ALIVE" 304 message is sent from the NSS to a processing node 102 to check if the target node is functioning. If the target is up, it responds to the request with an OK message. Fields 302b, 302c, and 302d are not valid.

The "NODE_DOWN" 306 message is from the NSS to a processing node 102. It indicates that the node specified in failed node field 302c has failed. The Filesystem Id field 302b contains the id of the filesystem that the failed node was servicing.

The "CLEANUP_STATE" 308 message is from the NSS to the back-up-server 104. It indicates that the back-up-server should prepare to receive RECOVERY messages from other processing nodes. The back-up-server 104 runs a consistency check on the file system specified by Filesystem Id field 302b. As part of the consistency check, the back-up-server applies the contents of a write-ahead log (history of operations done on the disk) to the disk.

The "START_RECOVERY" 310 message is from the NSS to a processing node 102–110. It indicates that the processing nodes should start recovery on file system indicated in field 302b.

"RECOVERY" 312 messages are sent from the processing nodes 102 to the back-up-server 106. Each contains the file data or token (lock) state 302d along with the file system id 302b for which the state is valid. Field 302c is not valid.

The "RECOVERY_COMPLETE" 314 message is sent from the NSS to a processing node 102. It indicates that recovery on file system indicated by field 302b is complete.

The "OK" 316 message is sent by the processing nodes to the NSS or back-up-server. It indicates that the requested operation is complete.

Figure 4:
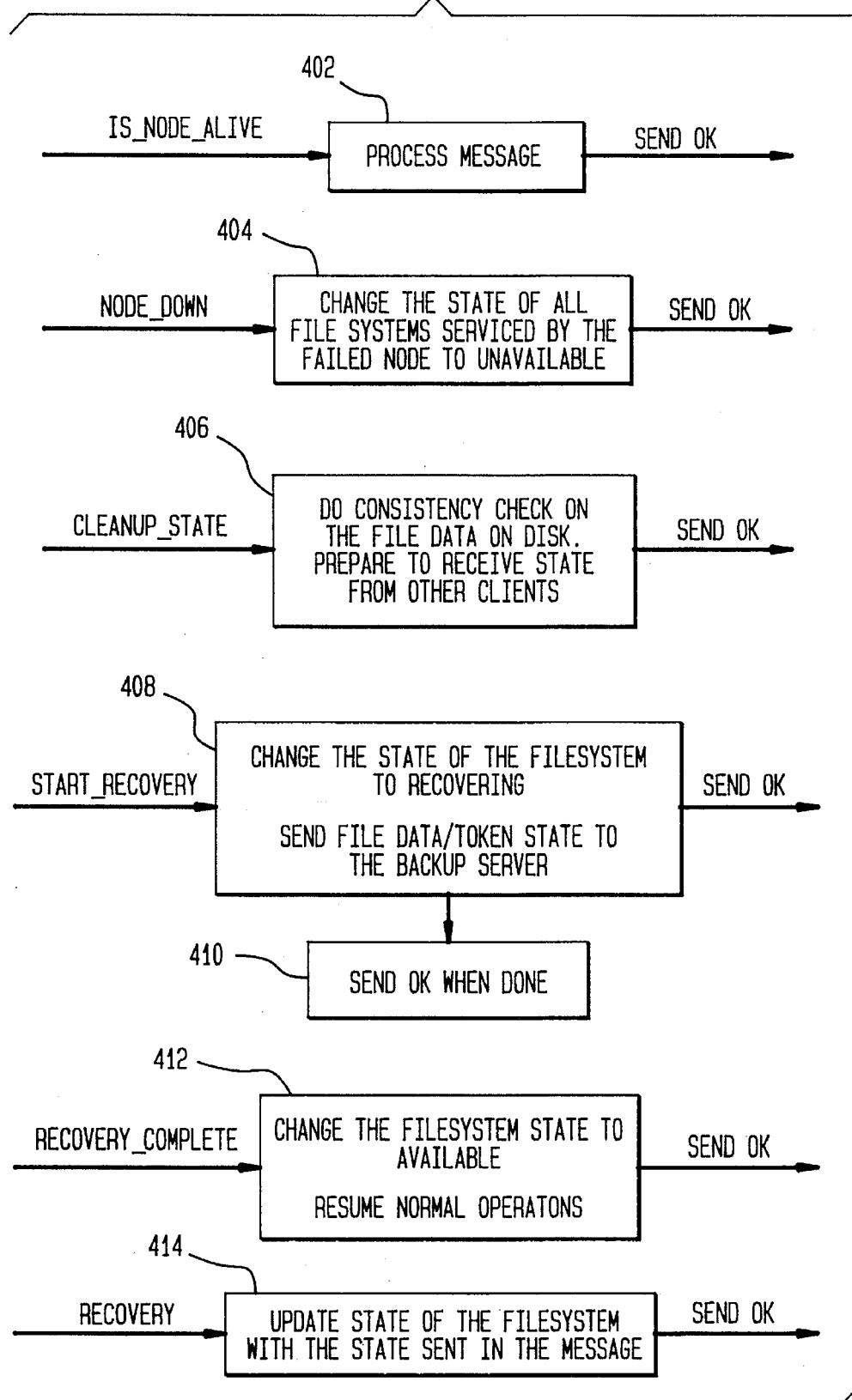
FIG. 4 shows the action taken in response to the various messages.

FIG. 4 shows the action taken in response to the various messages. When a node receives an IS_NODE_ALIVE 304 message from NSS, it processes the message in step 402 and sends an OK 316 message to NSS.

When a node receives a NODE_DOWN 306 message from NSS, it suspends all file system operations and marks the filesystem as being UNAVAILABLE (step 404). After completing step 404, it sends an OK to NSS.

When a back-up-server receives a CLEANUP_STATE 308 message, it runs consistency check on the file system in step 406 and returns OK to NSS when done.

When a node receives START_RECOVERY 310 message from NSS, in step 408 it marks the file system state as RECOVERING, traverses its local data structures 128, 130 and sends RECOVERY 312 messages to the back-up-server. In step 410, when all of the state information has been sent to the back-up-server, the node returns OK to NSS.

When a node receives RECOVERY_COMPLETE 314 message from the NSS, it marks the filesystem state as being AVAILABLE and resumes all normal operations on the file system. After completing step 412, it sends an OK to NSS.

When the back-up-server receives RECOVERY 312 messages from the nodes, in step 414 it updates the state of the filesystem and returns OK to the node.

Figure 5:
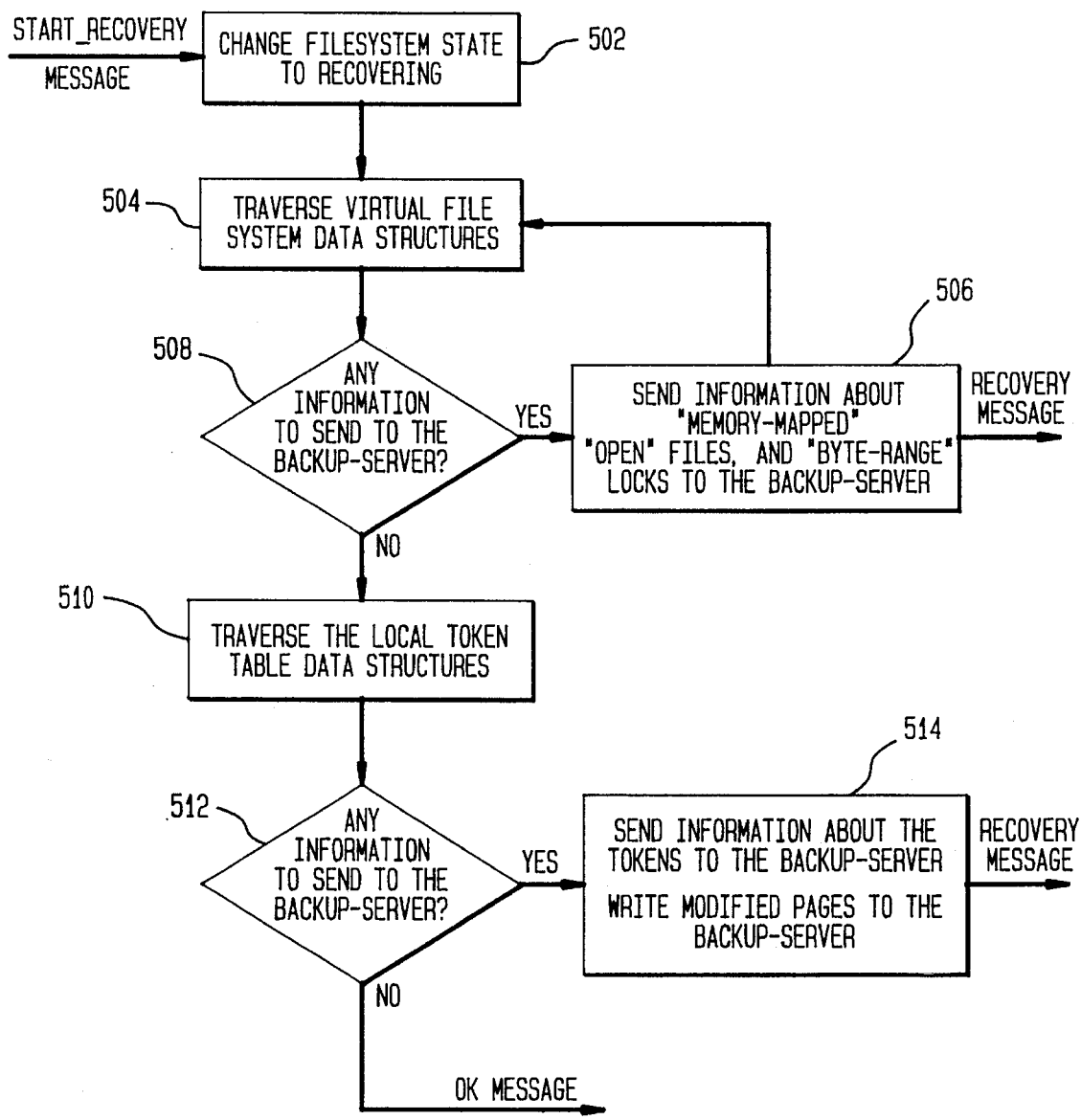
FIG. 5 is a flow chart of a recovery process according to an embodiment of the present invention.

A flowchart of the recovery process is shown in FIG. 5. When a client node receives a START_RECOVERY message, in step 502 it changes the file system status to RECOVERING. Then, in step 504, each client node traverses its data structures that maintain the state information for the filesystem and determines if any state information needs to be sent to the back-up server 508. If information needs to be sent then, in step 506, the client node transfers the state information to the back-up server via a RECOVERY message. This process continues until no more information needs to be transferred.

Next in step 510, the client node traverses its lock state tables and determines if any state information needs to be sent to the back-up server 512. If information needs to be sent then in step 514, the client node transfers the state information about the tokens cached at the node. In addition, any modified (dirty) data pages for any files belonging to that file system are flushed (written) back at the back-up server via a RECOVERY message. This process continues until no more information needs to be transferred.

When all the state has been transferred, the client node sends an OK message to the back-up server.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for non-disruptive recovery from a file server failure, comprising the steps of:
   a) maintaining, among a plurality of processing nodes of a distributed system, state information for a file system managed by the file server, wherein each of the processing nodes maintains only a subset of the state information;
   b) detecting a failure of the file server by one of the processing nodes;
   c) suspending all ongoing requests to the file server;
   d) identifying a back-up server;
   e) transferring the state information in each processing node to the back-up server;
   f) reconstructing on the back-up server from the state information, a file system state prior to the failure by forming a union of the state information maintained by each of the processing nodes and storing the union in the back-up server; and,
   g) after the reconstructing, restarting the requests on the back-up server.

2. The method of claim 1 comprising the further steps of designating one of the processing nodes as the back-up server and storing information identifying the back-up server in a memory accessible to the one of the processing nodes.

3. The method of claim 1 wherein the processing nodes are client nodes of the file server.

4. The method of claim 1 wherein the one of the processing nodes is identified as the back-up server when the distributed system is initialized.

5. The method of claim 1 wherein in response to detecting of the failure of the file server, each of the processing nodes sends the subset of information to the back-up server.

6. The method of claim 1 wherein the one of the processing nodes determines that the file server has failed by repeatedly requesting an acknowledgement from the file server that it is operational and by detecting that the failure of the file server has occurred when the acknowledgment has not been received within a timeout period.

7. The method of claim 1 wherein the one of the processing nodes is designated as the back-up server when the distributed system is initialized.

8. The method of claim 1 wherein the back-up server is identified responsive to detection of the failure of the file server.

9. The method of claim 1 wherein the state information includes identification of open files, descriptors for memory mapped files and byte range locks on the files.

10. A method for non-disruptive recovery from a file server failure, comprising the steps of:
    a) maintaining, among a plurality of client nodes of a distributed system, state information for a file system managed by the file server, wherein each of the client nodes maintains only a subset of the state information;
    b) storing an identity of a back-up server in a memory accessible to the client nodes;
    c) detecting a failure of the file server;
    d) suspending all ongoing requests to the file server;
    e) in response to the detecting of the failure, informing other ones about the client nodes of the failure;
    f) in response to notification of the failure of the file server, transferring the state information in each client node to the back-up server;
    g) reconstructing on the back-up server from the state information, a file system state prior to the failure by forming a union of the state information maintained by each of the processing nodes and storing the union in the back-up server; and,
    h) after the reconstructing, restarting the requests on the back-up server.

11. The method of claim 10 wherein the state information includes identification of open files, descriptors for memory mapped one of the files and byte range locks on the files.

12. A distributed system having a mechanism for non-disruptive recovery from a file server failure, said distributed system comprising:

a plurality of processing nodes coupled by a communication network, at least a first one of the processing nodes including a storage media having a file system which is shareable among the processing nodes, each of the processing nodes including a memory have a subset of state information for the file system stored therein, the union of the state information stored in the processing nodes forming a complete set of the state information for the file system;

at least a second one of the processing nodes further including program logic for detecting a failure of the first one of the processing nodes and for informing others of the processing nodes of the failure;

each of the processing nodes including program logic, responsive to being informed of a failure of the first one of the processing nodes for suspending all ongoing requests to the one of the processing nodes and for transferring the subset of the state information to a designated back-up server;

the back-up server including program logic for reconstructing from the subsets of the state information, a file system state prior to the failure;

wherein the back-up server includes means for forming a union of the state information maintained by each of the processing nodes.

13. The system of claim 12 wherein the state information includes identification of open files, descriptors for memory mapped one of the files and byte range locks on the files.

* * * * *